Nov. 14, 1967 — O. E. CALLANEN — 3,352,029
MOTION SYSTEM FOR FLIGHT SIMULATION
Filed May 11, 1966 — 2 Sheets-Sheet 1

INVENTOR
OLIVER E. CALLANEN
BY Hurvitz & Rose
ATTORNEYS

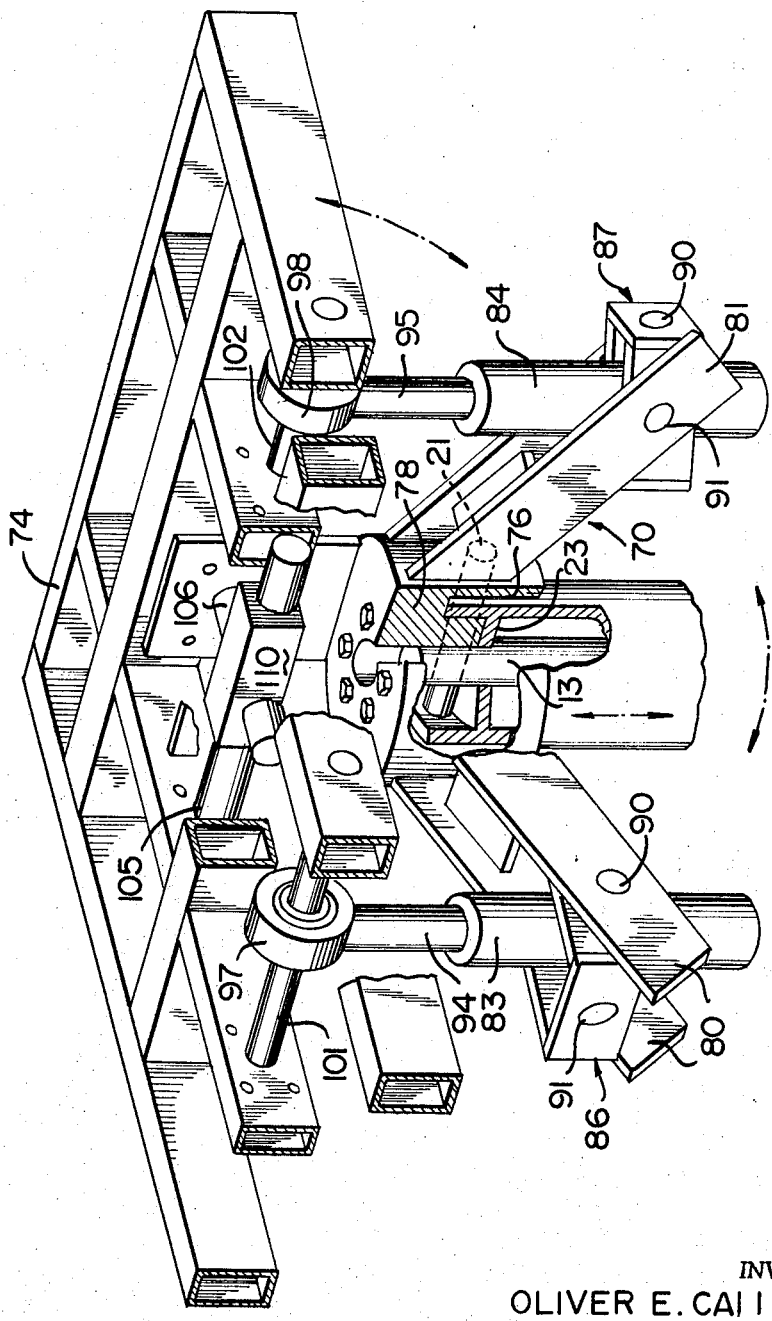

United States Patent Office
3,352,029
Patented Nov. 14, 1967

3,352,029
MOTION SYSTEM FOR FLIGHT SIMULATION
Oliver E. Callanen, Falls Church, Va., assignor to Melpar, Inc., Falls Church, Va., a corporation of Delaware
Filed May 11, 1966, Ser. No. 549,197
10 Claims. (Cl. 35—12)

ABSTRACT OF THE DISCLOSURE

A flight motion simulating system for aircraft training devices, in which a common structural member, having an axis coincident with the yaw axis of a platform supporting the device, includes a hydraulic cylinder and a torque transmitting tube for imparting independent translational and rotational motion to the platform relative to its yaw axis. Additional hydraulic cylinders and gimbal mounts are employed to couple the common structural member to the platform and to further independently produce roll and pitch, as desired.

Figure 1:
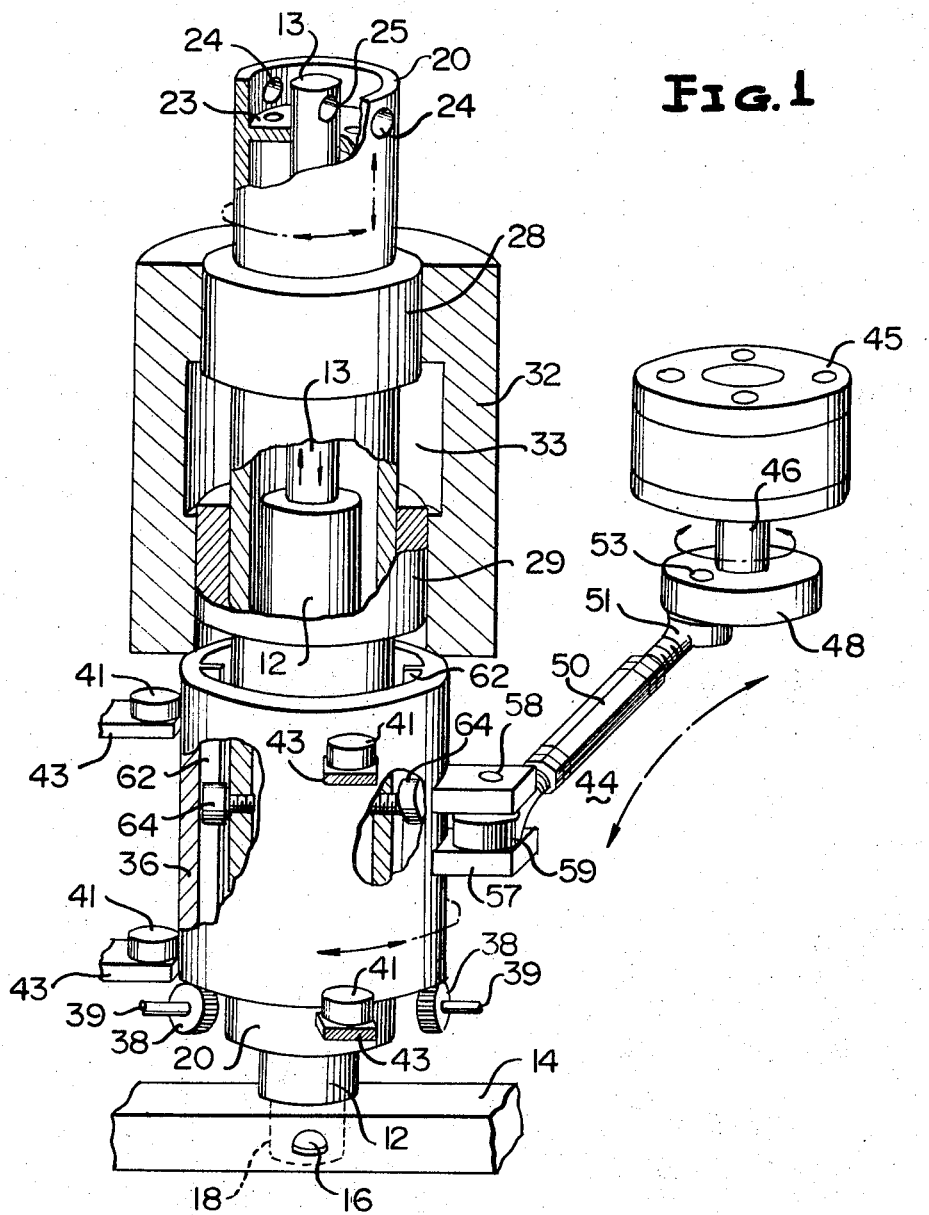

The present invention relates generally to flight simulators; that is, grounded training devices, sometimes referred to simply as "trainers," arranged and adapted to imitate the behavior of an aircraft or other controllable flying object during actual flight conditions. More particularly, the invention relates to improvements in the electro-mechanical or electro-hydraulic motion system for such flight simulators.

As is well known, the attitude of an aircraft, missile, spacecraft, or other flying object is that aspect which it presents with reference to a fixed coordinate system at any given instant of time. Conventionally, attitude is described or defined with reference to three mutually perpendicular axes of the aircraft in a Cartesian coordinate system, the three axes intersecting at the center of gravity of the aircraft which defines the origin of the coordinate system. The axis corresponding to the horizontal axis in the plane of symmetry of the object or vehicle in horizontal flight, usually parallel to the axis of thrust, is termed the longitudinal or roll axis; the normal or yaw axis is perpendicular to the longitudinal axis in the plane of symmetry, i.e., vertical relative to the longitudinal axis of an aircraft in horizontal flight; and the lateral or pitch axis is perpendicular to the other two axes. Attitude, therefore, may be described by inclinations about these three axes of the flying object, and is customarily referred to in terms of roll, yaw and pitch, the angular displacement or rotation of the aircraft about its longitudinal, normal and lateral axes, respectively. Obviously, since the aircraft may be subjected to any one or more of these angular displacements, either intentionally or unintentionally, under actual conditions of flight, it is important that any ground based structure devised to simulate the motion of the aircraft in flight be similarly adapted and equipped. Moreover, an aircraft is also exposed to air currents and other forces tending to cause upward or downward movement, relative to the earth, referred to as heave.

Unfortunately, prior art motion systems for flight simulation have generally included means for providing only one or two of these displacements, and seldom more than heave, roll and pitch. In those systems where a means for producing yaw was incorporated, the system structure has been complex and space consuming, and has had high inertia.

Accordingly, it is a primary object of the present invention to provide an improved motion system for general purpose flight simulation.

It is a more specific object of the present invention to provide a general purpose flight simulation motion system providing roll, pitch, heave and yaw in a relatively compact, simple structure having low operational inertia.

Briefly, in accordance with the present invention the motion system includes a grounded frame or platform adapted to support a training device and having pitch, roll and yaw axes, a common structural member having an axis coincident with the yaw axis for imparting heave to the platform in a direction along the yaw axis and for imparting rotational movement to the platform about the yaw axis, the common structural member including a linear motion-actuating hydraulic cylinder and an independently actuated torque transmitting member, a pair of hydraulic cylinders for rotating the platform about the roll axis and pitch axis, and gimbal mounts coupling the pair of hydraulic cylinders to mounting arms connected in mutually perpendicular planes to the common structural member, the planes intersecting along the yaw axis. All of the motion actuating hydraulic cylinders are operable independently of one another, and the structural arrangement with the pitch and roll actuators mounted on the common structural member provides a compact system with the advantage of separate or concurrent attitude of the platform relative to its three coordinate axis.

It is therefore a further object of the invention to provide a motion system for flight simulation in which yaw and heave are introduced by a common structural member.

Another object of the invention is to provide a motion system for flight simulation, wherein a common structural member is utilized to impart heave and yaw, and wherein the yaw control includes a novel guide bearing arrangement adapted to permit independent heave and yaw actuation.

The above and still further objects, features and advantages of the present invention will become apparent upon consideration of the following detailed description of one specific embodiment thereof, especially when taken in conjunction with the accompanying drawing, wherein:

FIGURE 1 is a perspective view, partly in section, of the significant portion of the heave-yaw imparting structure; and FIGURE 2 is a perspective view, partly in section, of the roll and pitch actuating mechanism and its relationship with the structure of FIGURE 1.

Referring now to the drawings, that portion of the motion system structure arranged to impart heave and yaw to the device (not shown) used for flight training or flight control testing, such as a trainer cockpit, is shown in FIGURE 1. A heave cylinder 12, which may be of any conventional design suitable under hydraulic control for imparting linear motion to a piston 13 projecting therefrom, is mounted, e.g., pinned, to a bridge member 14 of the base frame for support thereby. Preferably, cylinder 12, which may be either single-acting or double-acting, is provided with seals which will permit independent rotation of the piston 13 during normal linear motion thereof, to eliminate the necessity of providing separate yaw seals. The use of a pin 16, which couples a projection 18 from the heave cylinder to bridge member 14 via a hole in the latter, to fasten the cylinder to the base frame, permits ready removal of the heave cylinder from the structure in the event that replacement or servicing is required.

A heave tube 20 is maintained in coaxial relationship with the piston rod by inwardly projecting spacer 23 at the top portion of the tube, and is coupled to the piston rod or shaft 13 by a large diameter pin 21 (FIGURE 2) inserted via aligned holes 24 and 25 in the two members. The heave tube is arranged within bearings 28 and 29 to slide vertically with the piston rod or to rotate about the piston axis. Bearings 28 and 29 are supported in spaced parallel relationship along the piston rod axis, which defines the axis of the heave-yaw imparting structure, by a housing 32 mounted to the base frame. An annular cavity 33 within housing 32 and communicating with both of bearings 28 and 29 is utilized as a reservoir for the bearing lubricant.

It will be observed that heave tube 20 is subtsantially coextensive with rod 13, and, at its lower end as viewed in the figure and relative to the base frame when in use, is disposed within a further coaxial tubular member 36, designated the yaw tube. Yaw tube 36 is supported for rotational movement about the axis of the piston rod 13 by bearings 38 mounted on rods 39 attached to the base frame. Additional bearings 41 mounted for rotation on brackets 43 coupled to the base frame, are spaced equiangularly about and in contact with the periphery of the yaw tube, at top and bottom thereof, for radially guiding the yaw tube as it is rotated in either direction in a manner to be described presently. Such an arrangement provides the necessary support and alignment of yaw tube 36 relative to heave tube 20 without any requirement of direct contact with the heave tube.

The forces for producing reversible rotation of the yaw tube are applied thereto by a drive system 44 including a conventional hydraulic torque motor 45 having a rotatable shaft 46 for turning a crank 48, a connecting rod 50 coupled to the crank by a bearing 51 and a pin 53, and a trunnion mount 57 fastened to yaw tube 36 and coupled to the connecting rod by a pin 58 and a bearing 59. The diameter of crank 48 is preferably such that as the crank rotates through an angle of 180 degrees (maximum travel) it imparts the torque required to produce the yaw motion of tube 36, while the mechanical coupling between crank and trunnion mount 57 results in zero movement of the yaw tube at either end of the yaw stroke. In this manner, there is eliminated any necessity of providing auxiliary stops or other safety devices for limiting the yaw motion.

Rotational forces are transmitted from the yaw tube to heave tube 20 by a pair of precision guide bars 62 fastened longitudinally along the inner surface of the yaw tube in diametrically opposed relationship and projecting radially inwardly therefrom, and by bearings 64 fastened to the heave tube and contacting corresponding sides of the guide bars with substantially zero clearance and backlash. The pair of bearings 64 is preferably secured in the plane of trunnion mount 57, but other locations may be utilized if more than a single pair of bearings are arranged to contact the guide bars.

In operation of the common structural member for imparting heave and yaw to the training device, piston rod 13 and heave tube 20 are subjected to linear motion in unison along the axis of symmetry, both upwardly and downwardly, in accordance with the actuation of rod 13 by hydraulic heave cylinder 12. In addition to this linear motion (heave) and independently thereof, the piston rod and heave tube may be subjected to rotation (yaw) about the axis of symmetry by the operation of drive system 44 and the action of the yaw tube-guide bar arrangement, which transmits the actuator rotary motion to the heave support member (heave tube 20) in such a manner that the limit of yaw acceleration approaches a maximum (yaw velocity approaches zero) as the angular displacement (left or right yaw) of the member approaches a maxmium. It will further be observed that this arrangement permits independent heave and yaw actuation via a common structural member during either simultaneous or separate introduction of heave and yaw to the flight trainer, since there is negligible torque influence on the heave actuator.

Referring now to FIGURE 2, the roll and pitch imparting mechanism or roll-pitch hanger 70 is coupled to an interface frame or platform 74 by which the flight trainer (e.g., a cockpit or other device, not shown) is supported, and is itself supported by the heave tube 20. To this end, that portion of the wall of the heave tube located above spacer 23 is inserted into a mating cylindrical channel 76 within a head member 78. Head 78 is then fastened to the heave tube by any suitable means such as bolts 80 which are threaded into tapped holes in the end of the heave tube. In addition, pin 21 extends through holes in the head aligned with holes 24 and 25 in the heave tube and piston rod 13, respectively. In this manner, the roll-pitch assembly 70, and hence interface frame 74, are subjected to the same vertical motion (heave) and rotation (yaw), relative to the axis of the piston rod, as is imparted to the heave tube and piston rod.

Roll-pitch assembly 70 includes two pairs of support arms 80, 81 securely fastened, as by welding, to head member 78 and projecting downwardly therefrom at an angle of approximately 45 degrees to the axis of the heave-yaw imparting member. The vertical planes of the support arms 80, 81 are mutually perpendicular and have that axis as their line of intersection. The two hydraulic actuating cylinders 83, 84 for producing pitch and roll, respectively, of the interface frame are mounted on gimbals 86 and 87 to permit limited rotation of each actuating cylinder in mutually perpendicular directions about pivot axes defined by pins 90 and 91, respectively.

Each of hydraulic cylinders 83, 84 is of the double acting type and imparts linear motion, when actuated, to a respective piston rod 94, 95 connected to a bearing 97, 98. Separate parallel pivot rods 101, 102 are inserted through each bearing and fastened to structural members of the interface frame so that the force exerted on either of piston rods 94 and 95 is transmitted to the frame. The interface frame is adapted to pivot about either of two mutually perpendicular axes in accordance with the respective actuation of the pitch cylinder 83 or the roll cylinder 84, or both, the latter axes being defined by the axes of pins 105 and 106 of heavy duty trunnion 110 which are fastened to cross-members of the frame.

When pitch cylinder 83 is actuated, piston rod 94 is forced upwardly (or downwardly, depending on the sense or direction of motion desired), causing the interface frame to rotate about pivot pin 105 and cylinder 84 to rotate in its gimbal mount about pin 90. In a similar manner, actuation of roll cylinder 84 produces rotation of interface frame 74 about pivot pin 106, each of the two actuating cylinders 83, 84 pivoting in their respective gimbal mounts as required to impart the desired motion to the frame. Hence, the flight trainer mounted on the interface frame may be subjected to any one or more of heave, yaw, pitch and roll by a compact, relatively simple, and low inertia motion system.

The three actuation cylinders for heave, roll and pitch, and the yaw motor, may be provided with a common source of hydraulic fluid pressure, and the fluid may be supplied to those units by conventional controllable electro-hydraulic servo valves. In such a case, the degree of motion for any attitude is indicated by a voltage change to the respective amplifier of the servo system from a voltage variable device such as a potentiometer. Hydraulic high pressure flexible hose, tubing, valves, filters, accumulators, and pumps may be utilized in known fashion to supply oil to the actuating cylinders, and may be supplemented by conventional heat exchangers, reservoir, temperature and pressure gauges and thermo switches, as necessary or desirable.

While I have disclosed a preferred embodiment of my invention, it will be apparent to those skilled in the art that variations in the specific details of construction which have been illustrated and described may be resorted to without departing from the spirit and scope of the invention, as defined in the appended claims.

I claim:

1. A motion system for general purpose flight simulation comprising a grounded device having pitch, roll and yaw axes; means having an axis coincident with the yaw axis of said device for independently imparting linear motion to said device along said yaw axis and rotational motion to said device about said yaw axis; said motion imparting means including a hydraulic cylinder having a translatable piston rod coincident with said yaw axis, a rotatable tubular member coaxial and substantially coextensive with said piston rod, means coupling said tubular member to said piston rod for common rotation or translation thereof respectively about or along said yaw axis; and further means coupling said motion imparting means to said device.

2. The combination according to claim 1 wherein said further coupling means includes a pair of hydraulic cylinders each having a translatable piston, means mounting said pair of hydraulic cylinders in mutually perpendicular planes having a line of intersection coinciding with said yaw axis, and means coupling each of said pair of cylinders to said device for rotation of said device respectively about the roll axis and pitch axis thereof in accordance with translation of the respective piston.

3. The combination according to claim 1 wherein said motion imparting means further includes a second rotatable tubular member having a common axis with the first-mentioned tubular member and with said piston rod, a pair of axial guide bars projecting radially toward a surface of said first-mentioned tubular means from a surface of said second tubular means, and bearing means fastened to said surface of said first-mentioned tubular means and contacting said guide bars for slidable movement relative thereto when said piston rod is translated and for torque transmitting coupling therewith when one of the first-mentioned and second tubular means is rotated.

4. The combination according to claim 2 wherein said device comprises a platform, a trunnion mount for said platform having pivot points about said roll axis and said pitch axis, each of said pistons having a bearing fastened thereto, means fastened to said platform for pivotal movement within said piston bearings, said mounting means including a separate gimbal coupling for each of said pair of hydraulic cylinders.

5. The combination according to claim 3 wherein said second tubular member is secured against translation; and wherein is further included a drive system for rotating said second tubular member, said drive system including means for restricting said second tubular member to rotation between predetermined limits of angular displacement in either direction from a reference point.

6. The combination according to claim 5 wherein said further coupling means includes a pair of hydraulic cylinders each having a translatable piston, means mounting said pair of hydraulic cylinders in mutually perpendicular planes having a line of intersection coinciding with said yaw axis, and means coupling each of said pair of cylinders to said device for rotation of said device respectively about the roll axis and pitch axis thereof in accordance with translation of the respective piston.

7. The combination according to claim 6 wherein each of said hydraulic cylinders is double acting to actuate said device in either direction of motion.

8. A motion system for general purpose flight simulation comprising a grounded device having pitch, roll and yaw axes; means having an axis coincident with the yaw axis of said device for independently imparting linear motion to said device along said yaw axis and rotational motion to said device about said yaw axis; said motion imparting means including a translatable piston rod coincident with said yaw axis, a rotatable tubular member coaxial with said piston rod, means coupling said tubular member to said piston rod for common rotation or translation thereof respectively about or along said yaw axis; and further means coupling said motion imparting means to said device, said further coupling means including means for producing pitch and roll of said device.

9. The combination according to claim 8 wherein said motion imparting means further includes a second rotatable tubular member having a common axis with the first-mentioned tubular member and with said piston rod, a pair of axial guide bars projecting radially toward a surface of said first-mentioned tubular means from a surface of said tubular means, and bearing means fastened to said surface of said first-mentioned tubular means and contacting said guide bars for slidable movement relative thereto when said piston rod is translated and for torque transmitting coupling therewith when one of the first-mentioned and second tubular means is rotated.

10. The combination according to claim 9 wherein said second tubular member is secured against translation; and wherein is further included a drive system for rotating said second tubular member, said drive system including means for restricting said second tubular member to rotation between predetermined limits of angular displacement.

References Cited

UNITED STATES PATENTS

| | | | |
|---|---|---|---|
| 1,393,456 | 10/1921 | Ruggles | 35—12 |
| 2,895,151 | 7/1959 | Link | 91—61 X |
| 2,930,144 | 3/1960 | Fogarty | 35—12 |
| 3,157,237 | 11/1964 | Kurt | 91—61 X |

EUGENE R. CAPOZIO, *Primary Examiner.*

ROBERT W. WEIG, *Assistant Examiner.*